United States Patent
Shimizu

(10) Patent No.: US 8,009,944 B2
(45) Date of Patent: Aug. 30, 2011

(54) OPTICAL WAVEGUIDE AND OPTICAL TOUCH PANEL

(75) Inventor: Yusuke Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/625,976

(22) Filed: Nov. 25, 2009

(65) Prior Publication Data

US 2010/0128006 A1 May 27, 2010

Related U.S. Application Data

(60) Provisional application No. 61/122,587, filed on Dec. 15, 2008.

(30) Foreign Application Priority Data

Nov. 26, 2008 (JP) .................................. 2008-301135

(51) Int. Cl.
G02B 6/26 (2006.01)
G02B 6/42 (2006.01)
(52) U.S. Cl. ............. 385/32; 385/50; 385/132; 345/176
(58) Field of Classification Search ............. 385/14, 385/32, 33, 50, 129–132; 345/173, 175, 345/176
See application file for complete search history.

(56) References Cited

U.S. PATENT DOCUMENTS

| 5,297,228 | A | * | 3/1994 | Yanagawa et al. ............ 385/129 |
| 5,914,709 | A | | 6/1999 | Graham et al. |
| 6,801,701 | B1 | * | 10/2004 | Montgomery et al. ....... 385/129 |
| 7,099,553 | B1 | * | 8/2006 | Graham et al. ............... 385/146 |
| 7,164,814 | B2 | * | 1/2007 | Ohtsu et al. ..................... 385/14 |
| 7,369,724 | B2 | * | 5/2008 | Deane ............................ 385/33 |
| 7,412,119 | B2 | * | 8/2008 | Smits ............................. 385/14 |
| 7,627,209 | B2 | * | 12/2009 | Hikita ............................ 385/32 |
| 7,738,755 | B2 | * | 6/2010 | Shioda ......................... 385/130 |
| 2006/0001653 | A1 | * | 1/2006 | Smits ........................... 345/176 |
| 2006/0114244 | A1 | * | 6/2006 | Saxena et al. ................ 345/175 |
| 2008/0198144 | A1 | | 8/2008 | Shimizu et al. |
| 2008/0252620 | A1 | | 10/2008 | Shimizu |

FOREIGN PATENT DOCUMENTS

| JP | 2007-070320 A | 3/2007 |
| JP | 2008-203431 A | 9/2008 |
| JP | 2008-262366 A | 10/2008 |

* cited by examiner

*Primary Examiner* — Daniel Petkovsek
(74) *Attorney, Agent, or Firm* — Westerman, Hattori, Daniels & Adrian, LLP

(57) ABSTRACT

An optical waveguide 30 having a bending groove 34 parallel to two long sides of a rectangular shape thereof. The optical waveguide 30 is bent along the bending groove 34 so as to come into close contact with a frame of an optical touch panel. This makes it possible to attach the optical waveguide 30 to the frame without misalignment during assembly. Therefore, the optical waveguide 30 can emit light beams in a direction perpendicular to one side of a rectangular display screen opposed to one long side of the rectangular shape thereof. Further, the width of the frame of the optical touch panel 30 can be made smaller than that of the optical waveguide 30. This makes it possible to achieve reduction in the width of the frame of the optical touch panel.

4 Claims, 5 Drawing Sheets

PRIOR ART

OPTICAL WAVEGUIDE AND OPTICAL TOUCH PANEL

BACKGROUND OF THE INVENTION

1. Field of the Invention

The present invention relates to an optical waveguide and an optical touch panel using the same.

2. Description of the Related Art

An optical touch panel using optical waveguides each having a plurality of cores and a cladding surrounding the cores has been conventionally known (for example, U.S. Pat. No. 5,914,709). Such an optical touch panel determines the coordinates of position of a finger or a pen blocking a grid of light beams (infrared light beams), which is formed over a display screen with the use of optical waveguides, by detecting the intensity of light beams blocked by the finger or pen. Further, an optical touch panel using optical waveguides is thin and highly sensitive, and is therefore expected to have great potential.

However, an optical touch panel using conventional optical waveguides has drawbacks in that it is difficult to perform the positioning of the optical waveguides and that it is also difficult to reduce the width of a frame thereof because the optical waveguides are arranged around a display screen.

FIG. 1 shows plan and sectional views of a main part of an optical touch panel 10 using conventional optical waveguides 13. In the optical touch panel 10 using the conventional optical waveguides 13, the optical waveguides 13 are provided on a frame 12 surrounding a display screen 11.

The two long sides of the rectangular flat plate-shaped optical waveguide 13 have to be parallel to the corresponding long side of the frame 12. However, actually, it is difficult to attach the optical waveguide 13 to the frame 12 so that the two long sides of the rectangular flat plate-shaped optical waveguide 13 becomes parallel to the corresponding long side of the frame 12 during assembly. Therefore, as shown in FIG. 1, misalignment (nonparallel) of the optical waveguide 13 is likely to occur. If such misalignment of the optical waveguide 13 occurs, as shown in FIG. 1, light beams 14 deviate from their normal emission direction, and are therefore not emitted in a direction perpendicular to one side of the rectangular display screen 11 opposed to one long side of the rectangular flat plate-shaped optical waveguide 13, thereby lowering optical transmission efficiency.

Further, in the optical touch panel 10 using the conventional optical waveguides 13, the width of the frame 12 represented by W1 needs to be equal to or larger than that of the optical waveguide 13 represented by W3. This makes it difficult to reduce the width "W1" of the frame 12.

SUMMARY OF THE INVENTION

It is therefore an object of the present invention to provide an optical waveguide capable of accurately and easily performing the positioning thereof during assembly and reducing the width of a frame of an optical touch panel.

FIG. 2 shows plan and sectional views of a main part of an optical touch panel 20 using an optical waveguide 23 of the present invention. In the optical touch panel 20 using the optical waveguide 23 of the present invention, the optical waveguide 23 is provided closely attaching to a frame 22 surrounding a display screen 21.

The optical waveguide 23 according to the present invention is a rectangular flat plate-shaped member, and has a bending groove 23a parallel to the two long sides of the rectangular shape thereof. The optical waveguide 23 is bent along the bending groove 23a so as to come into close contact with the frame 22. This makes it possible to easily attach the optical waveguide 23 to the frame 22 without misalignment during assembly. The prevention of the occurrence of misalignment makes it possible to emit light beams 24 from the optical waveguide 23 in a direction perpendicular to one side of the rectangular display screen 21 opposed to one long side of the rectangular flat plate-shaped optical waveguide 23.

Further, the width of the frame 22 represented by W2 can be made smaller than that of the optical waveguide 23. This makes it easy to reduce the width of the frame 22 of the optical touch panel 20.

Summary of the present invention is as follows:

In a first preferred embodiment, an optical waveguide of the present invention is a rectangular flat plate-shaped optical waveguide having a side surface corresponding to one long side of a rectangular shape thereof and a main surface, which comprises: a plurality of cores each having an end; a cladding surrounding the cores; and a bending groove, wherein the ends of the cores are arranged in parallel in the side surface, and the bending groove is provided in the main surface so as to be parallel to two long sides of the rectangular shape thereof.

In a second preferred embodiment, the optical waveguide of the present invention is characterized by being bent along the bending groove so that a bent inside surface thereof comes into close contact with a peripheral portion of a display screen of an optical touch panel.

In a third preferred embodiment, the optical touch panel of the present invention is characterized by comprising the above-described optical waveguide.

ADVANTAGES OF THE INVENTION

When an optical touch panel is produced using the optical waveguides of the present invention, the positioning of the optical waveguides can be easily and accurately performed. For example, in the case of a 4.2-inch optical touch panel having four optical waveguides, it takes about 30 minutes to complete the positioning of optical waveguides when using conventional ones. However, the time required to complete the positioning of optical waveguides can be reduced to about 5 minutes by using the optical waveguides of the present invention.

Further, when an optical touch panel is produced using the optical waveguides of the present invention, the width of a frame portion of the optical touch panel can be reduced to, for example, about ½ of that of an optical touch panel using conventional optical waveguides.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
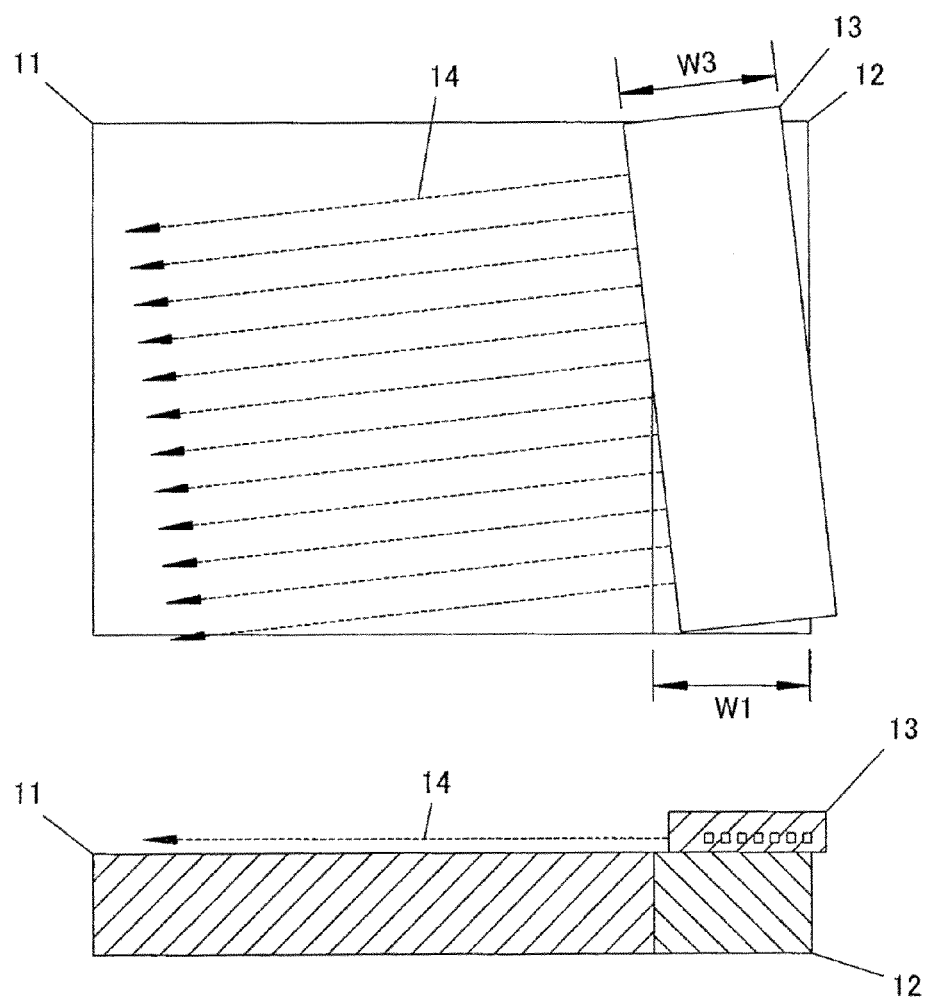
FIG. 1 shows plan and sectional views of an optical touch panel using conventional optical waveguides.

The preferred embodiments of the present invention will now be described with reference to FIGS. 1-5 of the drawings. Identical elements in the various figures are designated with the same reference numerals.

<Optical Waveguide>

Figure 3:
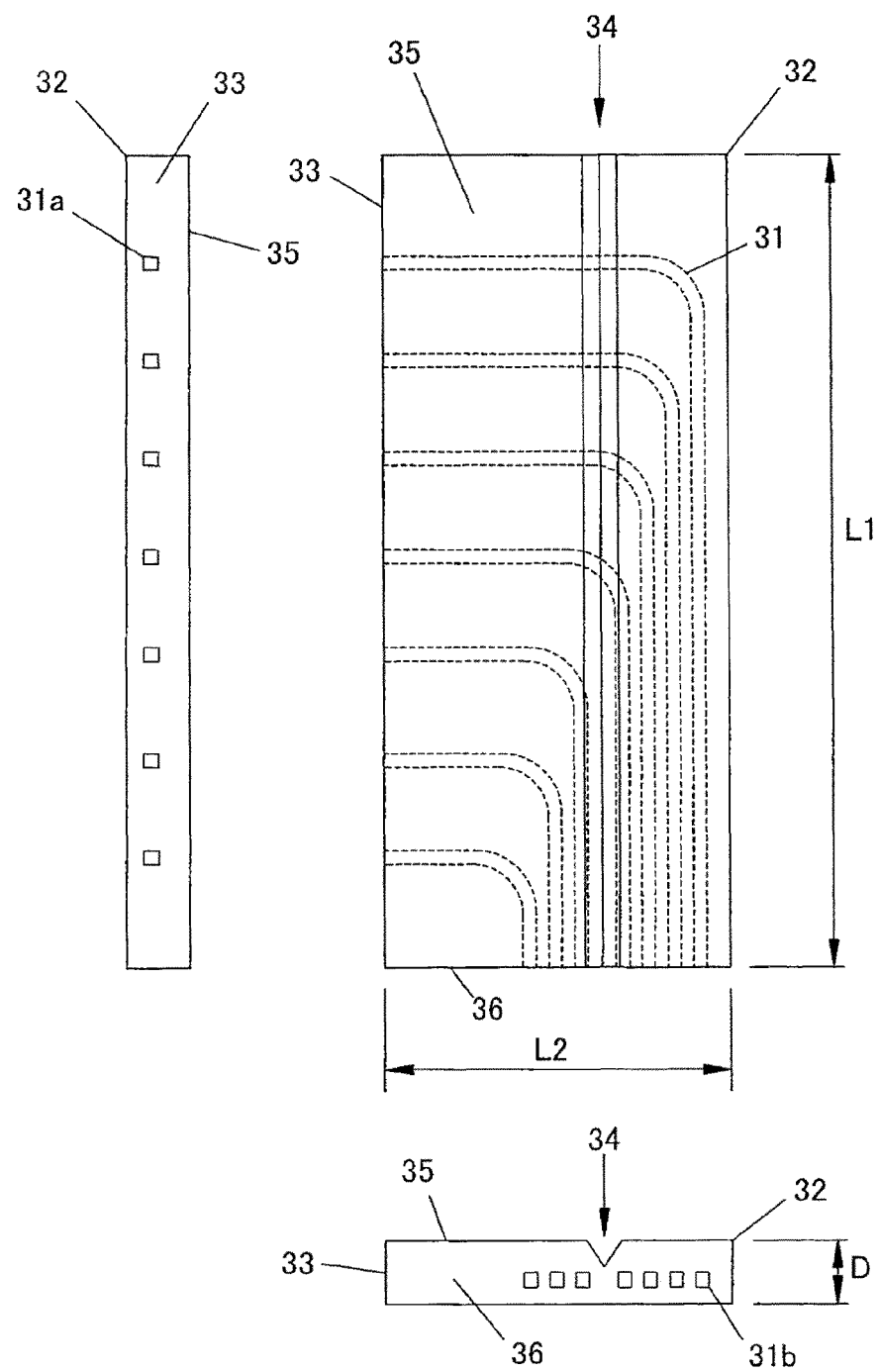
FIG. 3 shows the three surfaces of the optical waveguide of the present invention.

As shown in FIG. 3, an optical waveguide 30 of the present invention is a rectangular flat plate-shaped member, and has a plurality of cores 31 and a cladding 32 surrounding the cores 31. The optical waveguide 30 of the present invention has a side surface 33 corresponding to one long side of the rectangular shape thereof (hereinafter, simply referred to as a "long side surface 33") and a main surface 35. In the long side surface 33, ends 31a of the cores 31 are arranged in parallel. The main surface 35 has a bending groove 34 parallel to the two long sides of the rectangular shape of the optical waveguide 30.

The optical waveguide 30 of the present invention is suitable for use in an optical touch panel that determines the coordinates of a finger or a pen blocking a grid of light beams (infrared light beams) generally intersecting at right angles, which is formed over a display screen, by detecting the intensity of light beams blocked by the finger or pen.

In such an optical touch panel, the optical waveguide 30 of the present invention emits or receives light beams through the ends 31a of the cores 31 arranged in parallel in the long side surface 33.

Figure 2:
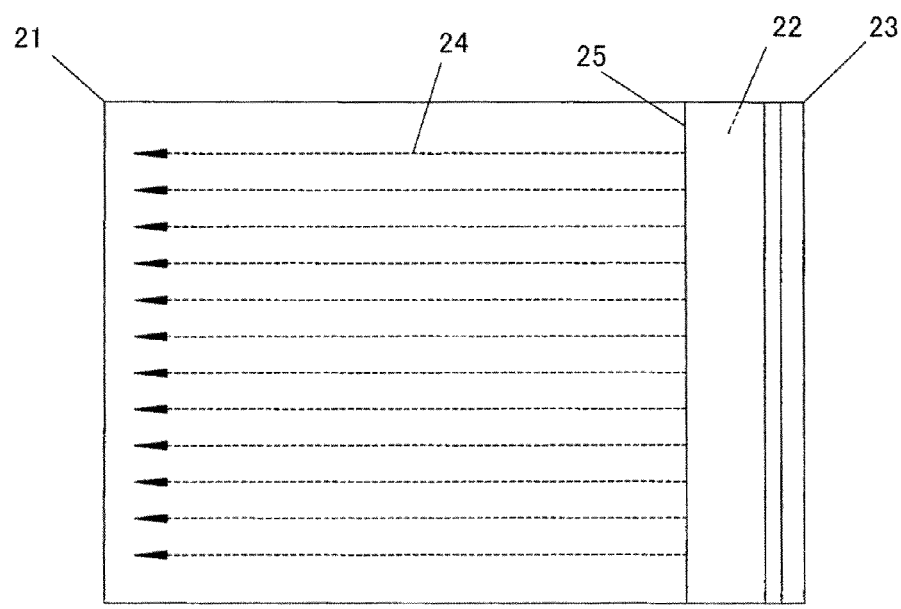
FIG. 2 shows plan and sectional views of an optical touch panel using optical waveguides of the present invention.
Figure 2:
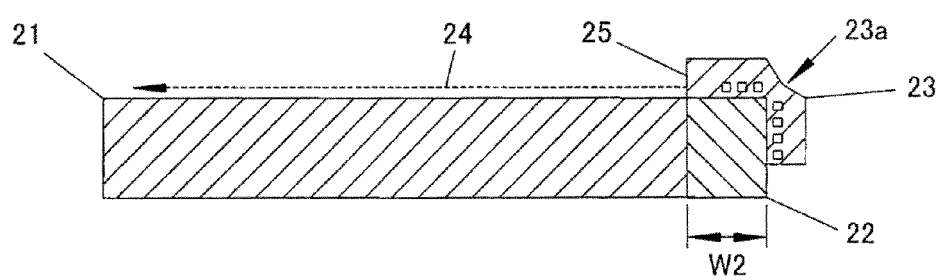

The bending groove 34 provided in the main surface 35 of the optical waveguide 30 of the present invention so as to be parallel to the two long sides of the rectangular shape of the optical waveguide 30 is used in the following manner. As shown in FIG. 2, an optical waveguide 23 of the present invention is bent along a bending groove 23a so as to come into close contact with a peripheral portion of a display screen 21 (typically, a frame 22) of an optical touch panel 20. This makes it possible to accurately and easily perform the positioning of the optical waveguides 23 of the present invention when the optical waveguides 23 are mounted on the optical touch panel 20.

Each of the cores 31 of the optical waveguide 30 of the present invention has the other end 31b. The ends 31b of the cores 31 are preferably arranged in parallel in a side surface 36 of the optical waveguide 30 corresponding to one short side of the rectangular shape of the optical waveguide 30 (hereinafter, simply referred to as a "short side surface 36"). In a case where the optical waveguide 30 of the present invention emits light beams through the ends 31a of the cores 31 arranged in parallel in the long side surface 33, the ends 31b of the cores 31 arranged in the short side surface 36 are optically connected to a light emitting element. On the other hand, in a case where the optical waveguide 30 of the present invention receives light beams through the ends 31a of the cores 31 arranged in the long side surface 33, the ends 31b of the cores 31 arranged in the short side surface 36 are optically connected to a light receiving element.

The thickness D of the optical waveguide 30 of the present invention is not particularly limited, but is usually in the range of 50 μm to 2 mm.

The length L1 of the long side of the rectangular shape of the optical waveguide 30 of the present invention is appropriately set depending on the size of a display screen of an optical touch panel to be produced. The length L2 of the short side of the rectangular shape of the optical waveguide 30 (i.e., the width of the optical waveguide 30) of the present invention is preferably in the range of 1 to 15 mm.

<Cores>

The cores 31 of the optical waveguide 30 of the present invention are formed from any material having a higher refractive index than the cladding 32 and high transparency at the wavelength of light traveling through the cores 31. A material forming the cores 31 is preferably a UV curable resin having excellent patterning properties. Preferred examples of such a UV curable resin include UV curable acrylic resins, UV curable epoxy resins, UV curable siloxane resins, UV curable norbornene resins, and UV curable polyimide resins.

The cross-sectional shape of each of the cores 31 is not particularly limited, but is preferably trapezoidal or rectangular from the viewpoint of patterning properties. The width of the cross section of each of the cores 31 is preferably in the range of 10 to 500 μm. The height of the cross section of each of the cores 31 is preferably in the range of 10 to 100 μm.

<Cladding>

The cladding 32 of the optical waveguide 30 of the present invention is formed from any material having a lower refractive index than that of the core 31. A material forming the cladding 32 is not particularly limited but is preferably a UV curable resin having excellent moldability. Preferred examples of such a UV curable resin include UV curable acrylic resins, UV curable epoxy resins, UV curable siloxane resins, UV curable norbornene resins, and UV curable polyimide resins.

The maximum difference in refractive index between the core 31 and the cladding 32 is preferably 0.01 or more, more preferably 0.02 to 0.2. It is to be noted that the refractive index of a polymer resin for forming the cores 31 and the cladding 32 can be increased or decreased by introducing an organic group appropriately selected into the polymer resin or changing the organic group content of the polymer resin. The refractive index of the polymer resin can be increased by, for example, introducing a cyclic aromatic group (e.g., a phenyl group) into a resin molecule or increasing a cyclic aromatic group content per resin molecule. On the other hand, the refractive index of the polymer resin can be decreased by, for example, introducing a linear or aliphatic group (e.g., a methyl group or a norbornene group) into a resin molecule or increasing a linear or aliphatic group content per resin molecule.

Figure 4:
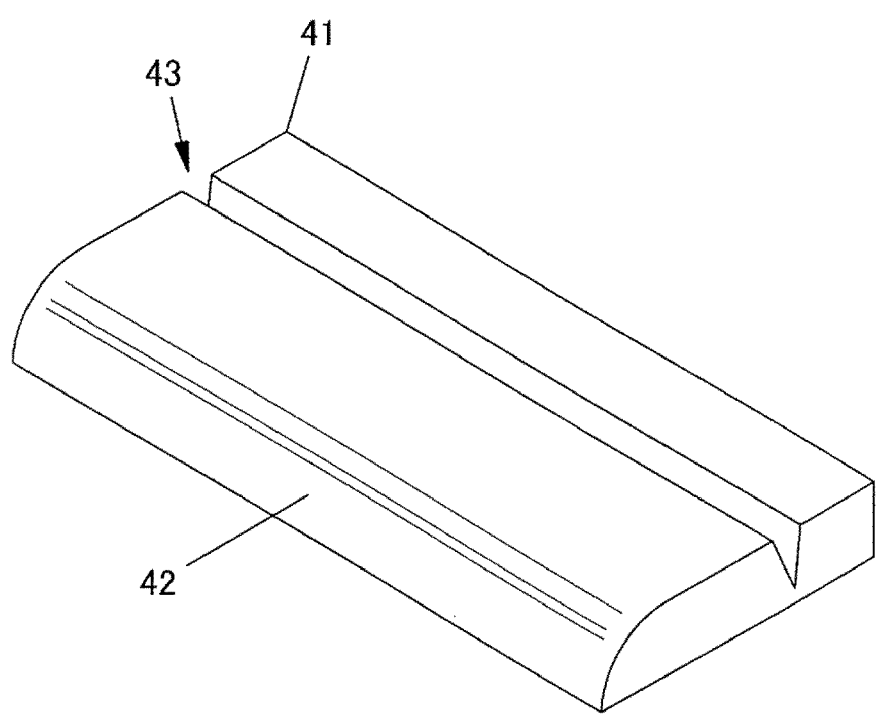
FIG. 4 is a perspective view of the optical waveguide of the present invention.

FIG. 4 shows an optical waveguide 40 of the present invention by way of example. The optical waveguide 40 has a cladding 41, and the cladding 41 has a side surface 42 corresponding to one long side of the rectangular shape of the optical waveguide 40 (hereinafter, simply referred to as a "long side surface 42"), in which the ends of a plurality of cores are arranged in parallel. The long side surface 42 preferably has a long lens shape. The optical waveguide 40 having the cladding 41 whose long side surface 42 has a long lens shape can convert outgoing light, which usually tends to diffuse, into parallel light beams or can concentrate incident light, which usually tends to diffuse, to receive concentrated light. Therefore, when the optical waveguide 40 of the present invention is used for an optical touch panel, which will be described later, a wider tolerance for the positioning of the long side surface 42 of the cladding 41 in a height direction is achieved. The optical waveguide 40 of the present invention has a bending groove 43 parallel to the two long sides of the rectangular shape thereof.

The long lens-shaped portion described above has preferably the shape of a convex lens, more preferably the shape of a convex lens having a cross-sectional shape of substantially a quarter of a circle, that is, the shape of a so-called half lenticular lens. In a case where the long lens-shaped portion has the shape of a convex lens, the curvature radius thereof is preferably in the range of 300 μm to 5 mm, more preferably in the range of 500 μm to 3 mm.

<Bending Groove>

As shown in FIG. 2, the optical waveguide 23 of the present invention is bent along the bending groove 23a formed in the main surface thereof to bring the inside surface thereof into close contact with a peripheral portion of the display screen 21 (typically, the frame 22). This makes it easy to make a side surface 25 corresponding to one long side of the rectangular shape of the optical waveguide 23 parallel to one side of the rectangular display screen 21.

The bending groove 34 of the optical waveguide 30 of the present invention (see FIG. 3) is formed in part of the cladding 32 not containing the cores 31 by pressing the edge of a knife against the cladding 32 so that the knife edge becomes parallel to the two long sides of the rectangular flat plate-shaped optical waveguide 30. The bending groove 34 may be formed in only one of the two main surfaces of the optical waveguide 30, that is, the main surface 35 or may be formed in both the two main surfaces. The cross-sectional shape of the bending groove 34 is not particularly limited. For example, the bending groove 34 may have a V-shaped cross section, a trapezoidal cross section, or a U-shaped cross section.

The thickness of the optical waveguide 30 remaining under the bending groove 34 (i.e., the minimum thickness of the optical waveguide 30) is preferably in the range of 50 to 200 µm. This makes it possible to achieve both high optical transmission efficiency and bendability of the optical waveguide 30.

If the thickness of the optical waveguide 30 remaining under the bending groove 34 is less than 50 µm, it is too small to form the cores 31 or, even when the cores 31 can be formed, there is a fear that optical transmission efficiency may be lowered due to insufficient thickness of the cladding 32. On the other hand, if the thickness of the optical waveguide 30 remaining under the bending groove 34 exceeds 200 µm, there is a fear that the bendability of the optical waveguide 30 may be deteriorated.

<Touch Panel>

The optical waveguide of the present invention can be used in an optical touch panel suitable for use in, for example, display monitors for personal computers, ATMs, ticket vending machines, game machines, and tablet PCs.

Figure 5:
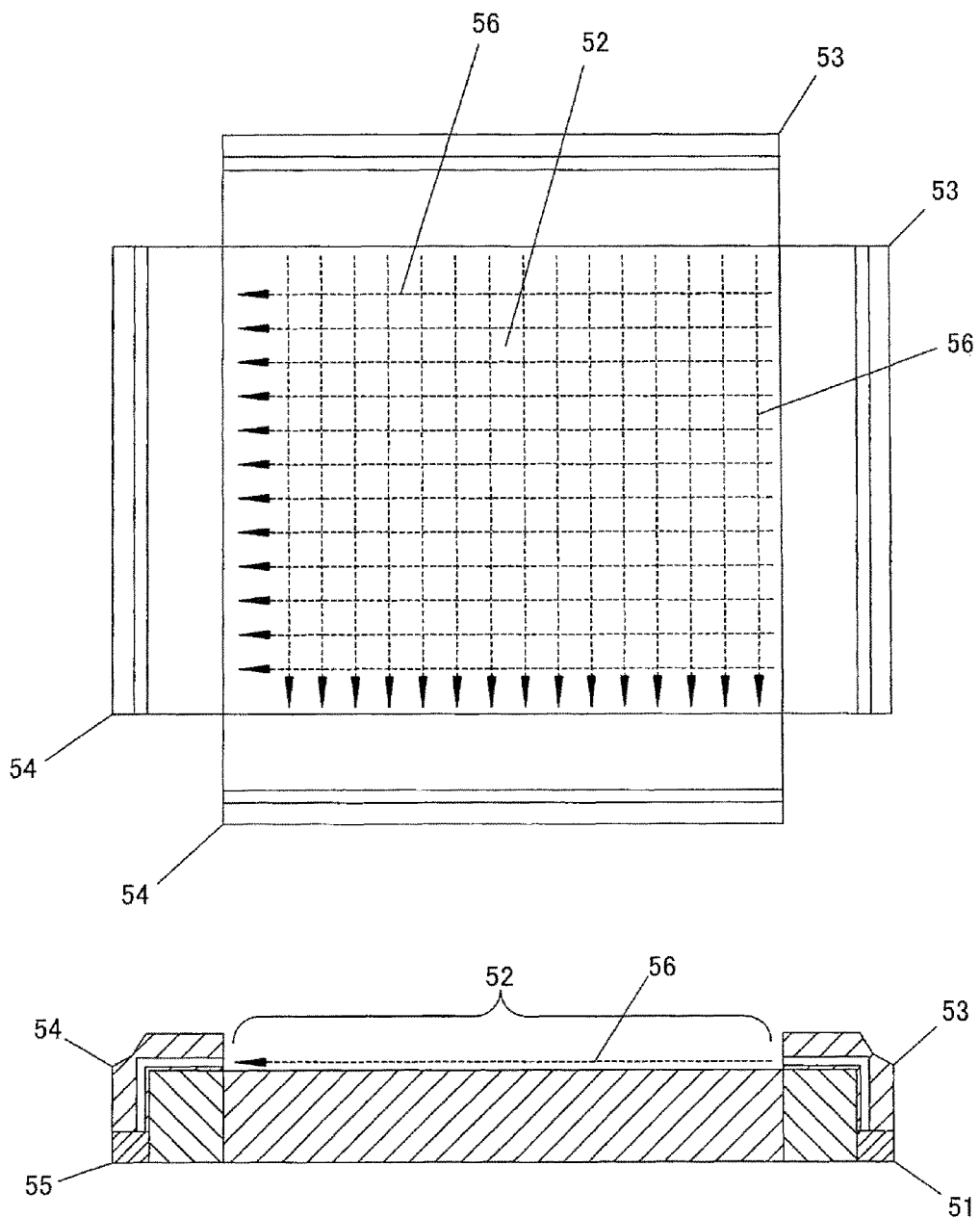
FIG. 5 shows plan and sectional views of an optical touch panel of the present invention.

FIG. 5 shows plan and sectional views of one embodiment of an optical touch panel 50 using the optical waveguides of the present invention. The optical touch panel 50 includes two light emitting elements 51, a coordinate input region 52, two light emitting-side optical waveguides 53, two light receiving-side optical waveguides 54, and two light receiving elements 55. The light emitting-side optical waveguide 53 transmits light emitted from the light emitting element 51 to generate light beams 56 crossing the coordinate input region 52. The light receiving-side optical waveguide 54 receives the light beams 56 which have crossed the coordinate input region 52. The light receiving element 55 detects the intensity of light received by the light receiving-side optical waveguide 54.

The light emitting element 51 is not particularly limited as long as it can generate light beams 56 that pass through the light emitting-side optical waveguide 53 and then cross the coordinate input region 52. The light emitting element 51 preferably emits light having a wavelength in the near-infrared range (700 nm to 2500 nm). Examples of a light emitting element suitable as the light emitting element 51 include light emitting diodes and semiconductor lasers.

The light receiving element 55 converts optical signals into electrical signals and detects the intensity of light received by the light receiving-side optical waveguide 54. The light receiving element 55 preferably detects light having a wavelength in the near-infrared range (700 nm to 2500 nm). Examples of a light receiving element suitable as the light receiving element 55 include CMOS image sensors and CCD image sensors.

The coordinate input region 52 refers to a region where the light beams 56 emitted from the light emitting-side optical waveguide 53 cross. The coordinate input region 52 is typified by, for example, a display screen such as a liquid crystal display panel or a plasma display panel. The coordinate input region 52 is preferably rectangular because it is easy to accurately adjust the position of the cores. An open space may be provided in front of the coordinate input region 52. Alternatively, a glass panel or an acrylic panel may be provided on the surface of the coordinate input region 52 to improve scratching resistance.

EXAMPLES

<Preparation of Varnish for Forming Cladding>

A varnish for forming cladding was prepared by mixing the following components:

Component A: UV-curable epoxy-based resin having an alicyclic skeleton (EP 4080E manufactured by ADEKA CORPORATION) 100 parts by weight Component B: photo-acid-generation agent (CPI-200K manufactured by SAN-APRO Ltd.) 2 parts by weight <Preparation of Varnish for Forming Cores>

A varnish for forming cores was prepared by mixing the following components:

Component C: UV-curable epoxy-based resin having a fluorene skeleton (OGSOL EG manufactured by Osaka Gas Chemicals Co., Ltd.) 40 parts by weight Component D: UV-curable epoxy-based resin having a fluorene skeleton (EX-1040 manufactured by Nagase ChemteX Corporation) 30 parts by weight Component E: 1,3,3-tris(4-(2-(3-oxetanyl))butoxyphenyl) butane 30 parts by weight (which was synthesized by the method described in Example 2 of Japanese Unexamined Patent Publication No. 2007-070320)

Component B 1 part by weight

Ethyl lactate 41 parts by weight

<Formation of Optical Waveguide>

The varnish for forming cladding layer was applied onto the surface of a polyethylene naphthalate film having a thickness of 188 µm, irradiated with UV light at 1000 mJ/cm$^2$, and thermally-treated at 80° C. for 5 minutes to form an under-cladding layer having a thickness of 20 µm. The refractive index of the under-cladding layer as measured at a wavelength of 830 nm was 1.510.

Then, the varnish for forming cores was applied onto the surface of the above described under-cladding layer and thermally-treated at 100° C. for 5 minutes to form a core layer. The core layer was then covered with a photo mask (gap: 100 µm), irradiated with UV light at 2500 mJ/cm$^2$, and thermally-treated at 100° C. for 10 minutes. Then, a plurality of cores each having a width of 20 µm and a height of 50 µm were formed by dissolving away an unexposed portion of the core layer using an aqueous γ-butyrolactone solution and thermally treating the core layer at 120° C. for 5 minutes. The refractive index of each of the cores as measured at a wavelength of 830 nm was 1.592.

Then, the entire cores were covered with the varnish for forming cladding to form a resin layer having a wet thickness of 60 µm. Then, the resin layer was heated at 80° C. for 5 minutes to remove air bubbles present around the cores. Then, a quartz concave-shaped mold was pressed against the resin layer, and the varnish for forming cladding was injected into the recess of the concave-shaped mold. Then, the varnish for forming cladding was irradiated with UV light at 2000 mJ/cm$^2$ through the concave-shaped mold and thermally treated at 80° C. for 5 minutes to form an over-cladding layer. Then, the concave-shaped mold was removed from the over-cladding layer. The thus obtained over-cladding layer had a thickness of 1 mm and was equipped with a convex lens having a cross-sectional shape of substantially a quarter of a circle (i.e., a half renticular lens having a radius of curvature of 1.5 mm) at its distal end. The refractive index of the over-cladding layer as measured at a wavelength of 830 nm was 1.510.

The edge of a knife was pressed against the rectangular flat plate-shaped optical waveguide (length: 76 mm, width: 12 mm, thickness 1.02 mm) so as to be parallel to the two long sides of the rectangular flat plate-shaped optical waveguide to form a bending groove having a maximum depth of 900 μm. In this way, an optical waveguide having a bending groove was produced.

<Production of Touch Panel>

The thus produced four optical waveguides were prepared and placed along the four sides of a rectangular glass plate (length: 88 mm, width: 88 mm) as a replacement for a display screen. Each of the optical waveguides was abutted against each side of the rectangular glass plate and bent along its bending groove so that the inside surface of the optical waveguide came into close contact with the glass plate. Then, the positioning of the optical waveguides was performed.

The ends of cores of each of the two light emitting-side optical waveguides were optically connected via a UV curable adhesive to a light emitting element emitting light having a wavelength of 850 nm (VCSEL manufactured by OPTOWELL CO., Ltd.). The ends of cores of each of the other two light receiving-side optical waveguides were optically connected via a UV curable adhesive to a light receiving element (CMOS linear sensor array manufactured by TAOS Inc.). In this way, an optical touch panel was produced. When the intensity of light emitted from the light emitting element was defined as 100%, the optical touch panel was designed to allow the light receiving element to detect light having an intensity of 10% of that of light emitted from the light emitting element. The optical touch panel could accurately determine the coordinates of position of a finger blocking light beams crossing a coordinate input region thereof.

Table 1 shows the frame width of the optical touch panel of the Example and the time required to complete the positioning of cores. The frame width refers to the width of an area covered with the optical waveguide placed on the surface of the glass plate along one side of the rectangular glass plate. The time required to complete the positioning of cores refers to the time required to complete the positioning of the optical waveguides to allow the light receiving element to detect light having an intensity of 10% of that of light emitted from the light emitting element. It is to be noted that in this example, the glass plate was used as a replacement for a display screen, but a highly-functional optical touch panel can be obtained by changing the glass plate to a display screen such as a liquid crystal display panel.

Comparative Example

An optical touch panel using the optical waveguides obtained in the Example was produced in the same manner as in the Example except that the formation of a bending groove was omitted. Table 1 shows the frame width of the optical touch panel of the Comparative Example and the time required to complete the positioning of cores.

TABLE 1

|  | Bending Groove | Frame Width (mm) | Time Required for Positioning (min) |
| --- | --- | --- | --- |
| Example | present | 6 | 5 |
| Comparative Example | absent | 12 | 30 |

<Method for Measuring Refractive Index>

The varnish for forming cladding layer was applied onto a silicon wafer by spin coating to form a film of the varnish, and the film of the varnish was used as a sample for measuring the refractive index of a cladding layer. The varnish for forming cores was applied onto another silicon wafer by spin coating to form a film of the varnish, and the film of the varnish was used as a sample for measuring the refractive index of a core. Measurement of refractive index was performed using a prism coupler (SPA-400 manufactured by Sairon Technology, Inc.).

This application claims priority from Japanese Patent Application No. 2008-301135, which is incorporated herein by reference.

There have thus been shown and described a novel optical waveguide and a novel optical touch panel which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A rectangular flat plate-shaped optical waveguide having a first side surface corresponding to one long side of a rectangular shape of the optical waveguide, a second side surface corresponding to one short side of the rectangular shape of the optical waveguide and a main surface, comprising:
    a plurality of cores each having a first end and a second end;
    a cladding surrounding the cores; and
    a bending groove provided in the main surface so as to be parallel to two long sides of the rectangular shape of the optical waveguide,
    wherein the first ends of the cores are arranged in parallel in the first side surface, and the second ends of the cores are arranged in parallel in the second side surface.

2. An optical touch panel comprising the optical waveguide according to claim 1.

3. A rectangular L-shaped optical waveguide, having a side surface corresponding to one long side of a rectangular shape thereof and a main surface, comprising:
    a plurality of cores each having an end;
    a cladding surrounding the cores; and
    a bending groove, wherein the ends of the cores are arranged in parallel in the side surface, and the bending groove is provided in the main surface so as to be parallel to two long sides of the rectangular shape thereof,
    wherein the L-shaped optical waveguide is bent along the bending groove so that a bent inside surface thereof comes into close contact with a peripheral portion of a display screen of an optical touch panel.

4. An optical touch panel comprising the optical waveguide according to claim 3.

* * * * *